United States Patent [19]

Brandau et al.

[11] 4,175,937

[45] Nov. 27, 1979

[54] GAS-CONTAMINANT SEPARATOR

[75] Inventors: Steven G. Brandau; Robert L. Carmichael, both of Cedar Falls, Iowa

[73] Assignee: Deere & Company, Moline, Ill.

[21] Appl. No.: 844,019

[22] Filed: Oct. 20, 1977

Related U.S. Application Data

[63] Continuation-in-part of Ser. No. 685,102, May 10, 1976, abandoned.

[51] Int. Cl.² .............................................. B01D 45/06
[52] U.S. Cl. ........................................ 55/419; 55/428; 55/444; 55/446; 55/DIG. 19; 123/41.86
[58] Field of Search .................. 55/308, 319, 385 B, 55/385 C, 419, 428, 442–446, DIG. 19; 123/41.86, 119 B, 196 CP

[56] References Cited

U.S. PATENT DOCUMENTS

| | | | |
|---|---|---|---|
| Re. 24,650 | 5/1959 | Leach | 123/41.86 |
| 1,306,421 | 6/1919 | Feltz | 55/443 |
| 1,459,461 | 6/1923 | Austin | 55/442 X |
| 1,869,553 | 8/1932 | Ellis | 123/41.86 |
| 1,915,521 | 6/1933 | Edwards | 55/446 |
| 1,944,341 | 1/1934 | Geise | 123/41.86 |
| 2,247,566 | 7/1941 | Walton | 55/446 X |
| 2,493,617 | 1/1950 | Chubbuck | 123/41.86 X |
| 2,731,958 | 1/1956 | Robley | 55/DIG. 19 X |
| 2,767,806 | 10/1956 | Blake | 55/446 X |
| 2,906,252 | 9/1959 | Beardsley | 123/119 B |
| 3,119,675 | 1/1964 | Gallagher | 55/446 X |
| 3,329,137 | 7/1967 | Ferrell | 123/41.86 X |
| 3,496,957 | 2/1970 | Gibellina | 55/446 |
| 3,498,205 | 3/1970 | Kautz et al. | 55/443 X |
| 3,721,069 | 3/1973 | Walker | 55/319 |
| 3,729,901 | 5/1973 | Jackson | 55/446 X |
| 3,765,386 | 10/1973 | Ottofy | 123/41.86 X |
| 3,908,617 | 9/1975 | Partridge | 123/119 B |

FOREIGN PATENT DOCUMENTS 349936 6/1931 United Kingdom ...................... 55/442

Primary Examiner—Kathleen J. Prunner

[57] ABSTRACT

A gas-contaminant separator includes inlet ports at the bottom of each leg of an inverted V-shaped housing and an outlet port at the top vertex. The total cross-sectional area of the inlet ports provide flow velocities below two meters per second and of the outlet port provides flow velocities below one and a half meters per second. First baffles are provided proximate the inlet ports to direct gas-contaminant mixtures towards and into a first contact with each other. Second baffles, disposed above the first contact zone cooperate with the housing to define a primary sedimentary precipitation zone and cause first retroversions of the mixtures towards and across the tops of the first baffles with the bulk of the contaminants being centrifugally precipitated by the first retroversions into the primary sedimentary precipitation zone for sedimentary precipitation to the bottoms of the housing. The sides of the housing cooperate with third baffles to cause second retroversions of primarily gas mixtures across the tops of the second baffles and into a second contact with each other. Fourth baffles, disposed above the second contact zone, cooperating with the housing, define a secondary precipitation zone and cause third retroversions of the mixtures towards and across the tops of the third baffles with the remaining contaminants being centrifugally precipitated by the third retroversions into the secondary sedimentary precipitation zone for sedimentary precipitation onto the second baffles. The sides of the housing cooperate with the fourth baffles to cause fourth retroversions of the gases towards the outlet.

9 Claims, 1 Drawing Figure

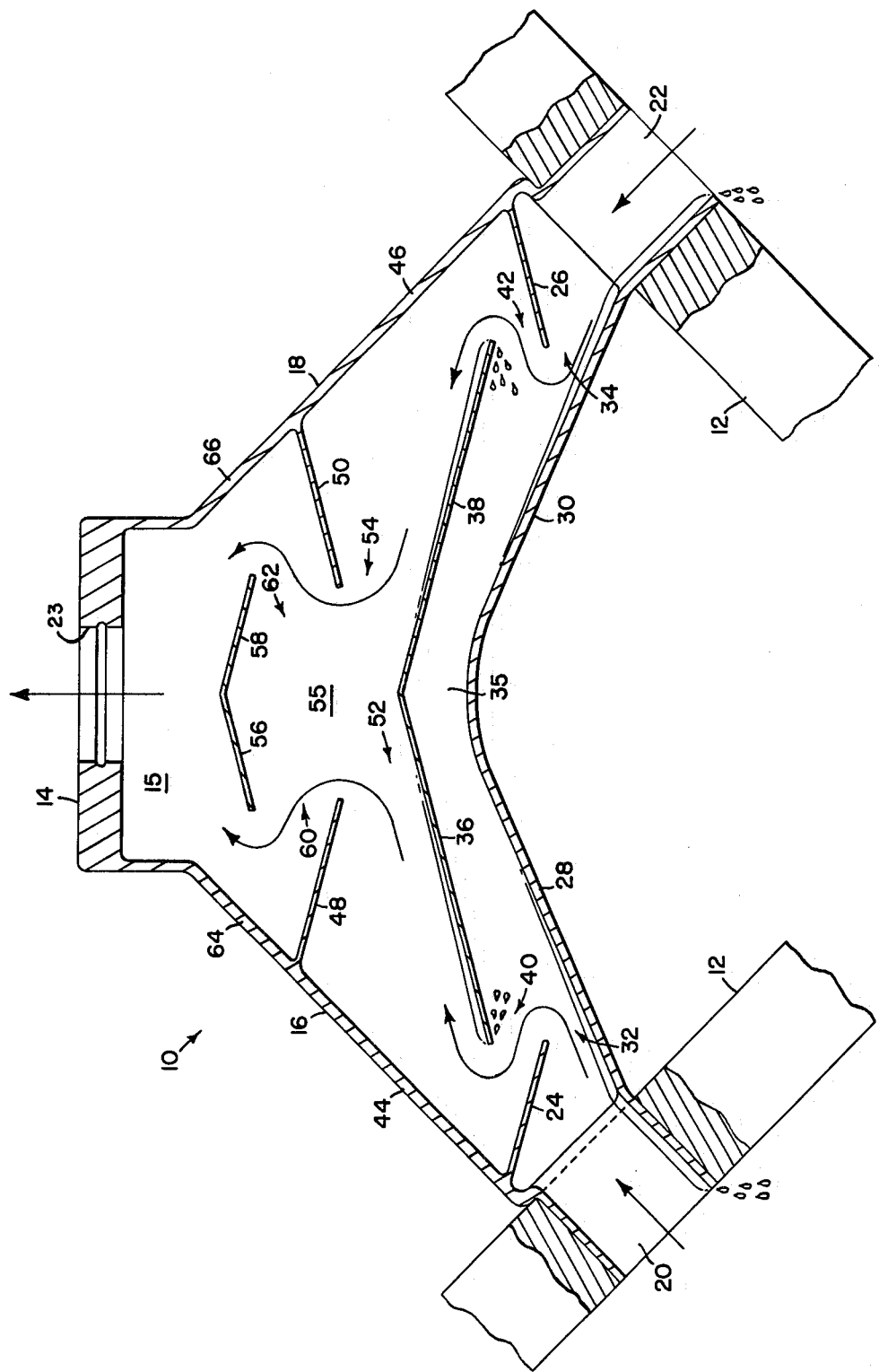

GAS-CONTAMINANT SEPARATOR

CROSS REFERENCE TO RELATED APPLICATION

This is a continuation-in-part of application Ser. No. 685,102 filed May 10, 1976 now abandoned.

BACKGROUND OF THE INVENTION

The present invention relates generally to apparatus for separating contaminants from gas-contaminant mixtures and in particular relates to combustion gas-oil contaminant separators for use with internal combustion engines. During the operation of internal combustion engines, combustion gases or blow-by leaking past the piston rings and entering the engine crankcase must be vented to prevent seal damage. Also, engine oil which has mixed with these gases forming an oil vapor mixture requires separating prior to venting to prevent oil carryover into the atmosphere.

In the past, the mixture was routed through a filter element to precipitate and return the oil to the crankcase in a manner similar to that shown in the U.S. Pat. No. 3,721,069 granted to R. A. Walker. However, these devices have not been entirely satisfactory since the filter elements soon become saturated and allowed the carryover of oil contaminants into the atmosphere.

Also in the past, multi-baffle systems were used such as those shown in the U.S. Pat. No. 1,306,421 granted to C. F. Feltz which relied on impactive precipitation of contaminant against numerous baffles and in the U.S. Pat. No. 1,915,521 granted to H. C. Edwards in which numerous baffles provided long circuitous paths against gravity coupled with impactive precipitation to cause separation. In both these systems, numerous baffles are required to achieve 100% separation.

SUMMARY OF THE INVENTION

The present invention provides a separator which is able to cause substantially 100% separation of oil-contaminants from engine crankcase blow-by gases with only four baffles. The separator provides sedimentary precipitation zones for sedimentary precipitation of portions of the oil-contaminants, flow retroversions to cause centrifugal precipitation of the remaining portions of the oil-contaminants into the sedimentary precipitation zones for sedimentary precipitation therein, and varying flow velocities therein to minimize oil-contaminant carryover from baffle to baffle.

The above and additional advantages of the present invention will become apparent to those skilled in the art from a reading of the following detailed description when taken in conjunction with the accompanying drawing.

BRIEF DESCRIPTION OF THE DRAWING

The drawing is a cross-sectional view of the separator of the present invention.

DESCRIPTION OF THE PREFERRED EMBODIMENT

Referring now to the drawing, therein is shown a separator generally designated by the numeral 10 for combustion gas-oil contaminant mixtures created by an internal combustion engine 12. The separator 10 is mounted in the engine 12 between the two banks of cylinders in a V-type internal combustion engine.

The separator 10 has an upright, generally triangular, inverted V-shaped housing 14 with legs 16 and 18 terminating in inlet ports 20 and 22. An outlet port 23 is situated at the top of the separator 10 in the vertex of the housing 14. The housing 14 is flat and has a planar rear wall 15 and a planar front wall (not shown).

While the engine illustrated in part by the number 12 is running, combustion gases carrying carbon and other contaminants tend to blow by the piston rings and enter the engine crankcase where the gases mix with the engine lubricating oil to form combustion gas-oil contaminant mixtures. The mixtures enter the separator 10 through the inlet ports 20 and 22 and generally follow flow paths indicated by the arrows.

As the mixtures flow through the inlet ports 20 and 22 they first encounter a first baffle set comprised of baffles 24 and 26 which direct the flows respectively toward bottoms or bottom portions 28 and 30 of the legs 16 and 18, through respective first flow areas 32 and 34, and towards each other. The mixtures contact and commingle in a primary sedimentary precipitation zone generally designated by the numeral 35. Disposed above the primary zone 35 is a long, second baffle set having joined together second baffles 36 and 38 which cause first retroversions of the mixtures away from each other and through second flow areas 40 and 42.

After passing through the second flow areas 40 and 42, the mixtures which now contain a minimum of contaminants pass across the tops of the first baffles 24 and 26 and are redirected towards each other to undergo second retroversions by the lower sides 44 and 46 of the housing 14 and by a third baffle set having third baffles 48 and 50. The mixtures pass through third flow areas 52 and 54 to contact and commingle in a secondary sedimentary precipitation zone generally designated by the numeral 55. Above the secondary zone 55 is a long, fourth baffle set having joined together fourth baffles 56 and 58 which causes third retroversions of what are now essentially gases away from each other and through fourth flow areas 60 and 62.

After passing through the fourth flow areas 60 and 62, the gases pass across the tops of the third baffles 48 and 50 and are redirected towards each other to undergo fourth retroversions by the upper sides 64 and 66 of the housing 14. The gases contact and commingle below the outlet port 23 before being exhausted from the housing 14 as a single flow.

The separator 10 functions upon the principles of sedimentary and centrifugal precipitation with a minimum of impactive precipitation. With sedimentary precipitation, the flow velocities of the mixtures are reduced to a nominal value and gravity separates the contaminants from the standing gases. With centrifugal precipitation, the flow directions of the mixtures are substantially retroverted with centrifugal and inertial forces flinging the contaminants out from the retroverted gases for sedimentary precipitation to occur away from the retroverted flows. In contrast, with impactive precipitation, flows are directed to impact on surfaces such that the contaminants will adhere and accumulate on the surfaces.

As the oil-contaminant mixtures are blown into the inlet ports 20 and 22, the mixtures strike the bottoms of the first baffles 24 and 26 and are directed towards the primary zone 35. With the inlet ports 20 and 22 each sized to limit the inlet flow velocities to not more than an experimentally optimized two meters per second, the bottoms of the first baffles 24 and 26 are scoured clean of impactive precipitants and the oil-contaminants are carried into the primary zone 35 where the opposing flow velocities are cancelled out and sedimentary precipitation occurs.

The first flow areas 32 and 34 were experimentally optimized at a size approximately 25% smaller than the flow areas of their respective inlet ports so as to cause flow velocity increases which will increase the degree of centrifugal precipitation during the first retroversions of approximately 120°. The contaminants centrifugally precipitated from the mixtures are flung into the primary zone 35 where they settle to the bottoms 28 and 30 by sedimentary precipitation. When sufficient masses of oil-contaminants accumulate on the bottom portions of the housing, 28 and 30, they drain down the inclined surfaces of the bottom portions 28 and 30 and return to the engine designated in part by the number 12 via the inlet ports 20 and 22.

After the first retroversions, about 85% of the contaminants are precipitated and only a small amount of contaminants are carried through the second retroversions of 120° which occur around the second flow areas 40 and 42 and which scour impactive precipitants from the tops of the baffles 24 and 26 and the lower sides 44 and 46.

After the second retroversions, the flow velocities are reduced through the third flow areas 52 and 54 which were respectively experimentally optimized at a size approximately 25% larger than the areas of the inlet ports 20 and 22. With the mixtures being directed into contact in the secondary zone 55 and third 120° retroversions occurring around the third baffles 48 and 50, substantially all the remaining contaminants are centrifugally and/or sedimentarily precipitated to the top of the second baffles 36 and 38, and only gases undergo the fourth 120° retroversions to combine and exhaust out of the outlet port 23 at not more than an experimentally optimized maximum of one and a half meters per second.

The top surfaces of all the baffles including the bottom portions 28 and 30 are inclined from the horizontal so as to permit accumulated oil-contaminants to slide on top of the mixture flows past the second flow areas 40 and 42 to fall on the inclined bottoms 28 and 30 and pass thence into the engine 12 through the inlet ports 20 and 22. In the preferred embodiment, it has been found that the preferred angle is not less than 10° from the horizontal although an angle up to 45° from the horizontal may be tolerated without seriously affecting the various flow areas.

By experimentation it has been determined that the majority of the oil-contaminants will be precipitated out before reaching the third flow areas 52 and 54, however, under extreme operating conditions it is possible for the engine 12 to be tilted up to 45° from the horizontal in which case it is possible for some of the baffles to become immersed in oil and in such a condition, the baffles 48, 50, 56, and 58 will act to provide all of the precipitation.

Experimentally, it has been determined that the separator 10 will reduce a carryover of 50 grams of oil-contaminants per hour down to zero grams in 200 hours.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. A separator for separating gas-contaminant mixtures into gases and contaminants comprising: a generally flat V-shaped housing including a hollow interior with a top portion and a bottom portion, an inlet port opening into the bottom portion at each leg of said V-shaped housing for receiving the mixtures, an outlet port opening from the top portion at the vertex of the V-shaped housing for outlet of the gases, the bottom portion including a pair of surfaces with inclinations of not less than 10° and not more than 45° from horizontal towards the inlet ports; first baffle means proximate said inlet ports for directing the mixtures from said inlet ports towards and into contact with one another, said first baffle means including surfaces inclined not less than 10° and not more than 45° from horizontal towards said bottom portion of the housing; said housing having second baffle means proximate said first baffle means cooperating with said bottom portion to cause the mixtures to contact and a first portion of the contaminants to be sedimentarily precipitated from the mixture, said second baffle means further cooperating with said first baffle means for causing a first retroversion of the mixtures away from and out of contact with one another so as to centrifugally precipitate a second portion of the contaminants from the mixtures, said second baffle means including surfaces inclined not less than 10° and not more than 45° from horizontal towards said first baffle means; said housing having third baffle means proximate and cooperating with the housing and said second baffle means for causing a second retroversion of the mixtures towards and into contact with one another, said third baffle means including surfaces inclined not less than 10° and not more than 45° from horizontal towards said second baffle means; and said housing having fourth baffle means proximate said third baffle means cooperating with the top portion of said housing and said second baffle means to cause the mixtures to contact and a third portion of the contaminants to be sedimentarily precipitated from the mixtures, said fourth baffle means cooperating with said third baffle means for causing a third retroversion of the mixtures away from and out of contact with one another so as to centrifugally precipitate the remaining portion of the contaminants from the mixtures and to direct the gases through said outlet port, said fourth baffle means including surfaces inclined not less than 10° and not more than 45° from horizontal towards said third baffle means whereby the first, second, and third retroversions are approximately 120° changes in the flow directions of the mixtures and the surfaces of the second baffle means and the bottom portion of the housing direct precipitated contaminants towards the inlet ports.

2. The separator as claimed in claim 1 wherein the inlet ports each define a flow area which provides inlet flow velocities of the mixtures into the inlet ports of not more than two meters per second and the outlet port defines a flow area which provides outlet flow velocities of the gases out of the outlet port of not more than one and a half meters per second.

3. The separator as claimed in claim 2 wherein the bottom portion of the housing and the first baffle means cooperate to define at least one flow area which is approximately 25% smaller than the flow area of one of the inlet ports.

4. The separator as claimed in claim 3 wherein the housing and the second and third baffle means cooperate to define at least one flow area which is approximately 25% greater than the flow area of one of the inlet ports.

5. A separator for separating blow-by combustion gas-oil contaminant mixtures into combustion gas and oil contaminants comprising: an inverted V-shaped housing having a generally inverted V-shaped bottom; said inverted V-shaped housing having an inlet port opening into each leg of said inverted V-shaped housing for receiving flows of the mixtures and having an outlet port opening from the vertex of said inverted V-shaped housing for exhausting combustion gas from said inverted V-shaped housing; said inverted V-shaped housing having first baffle means proximate said inlet ports for directing the mixtures from said inlet ports towards and into contact with one another; said inverted V-shaped housing having second baffle means above said first baffle means cooperating with said inverted V-shaped bottom to cause the mixtures to contact one another and a first portion of the contaminants to be sedimentarily precipitated from the mixtures, said second baffle means cooperating with said first baffle means for causing a first retroversion of the mixtures away from and out of contact with one another so as to centrifugally precipitate a second portion of the contaminants from the mixtures; said inverted V-shaped housing having third baffle means above said second baffle means cooperating therewith for causing a second retroversion of the mixtures towards and into contact with one another; said inverted V-shaped housing having fourth baffle means above said third baffle means cooperating with said third baffle means to cause the mixtures to contact one another and a third portion of the contaminants to be sedimentarily precipitated from the mixtures, said fourth baffle means cooperating with said third baffle means for causing a third retroversion of the mixtures away from and out of contact with one another so as to centrifugally precipitate the remaining portion of the contaminants from the mixtures; said inverted V-shaped housing having inside surfaces cooperating with said fourth baffle means for causing a fourth retroversion of the mixtures towards and into contact with one another.

6. The separator as claimed in claim 5 wherein the bottom of the housing has a pair of surfaces with inclinations of not less than 10° and not more than 45° from horizontal towards the inlet ports; the first baffle means includes surfaces inclined not less than 10° and not more than 45° from horizontal towards the bottom of the housing, the second baffle means includes surfaces inclined not less than 10° and not more than 45° from horizontal towards the first baffle means, the third baffle means includes surfaces inclined not less than 10° and not more than 45° from horizontal towards the second baffle means, and the fourth baffle means includes surfaces inclined not less than 10° and not more than 45° from horizontal towards the third baffle means whereby the first, second, third, and fourth retroversions are approximately 120° changes in the flow directions of the mixtures and the surfaces of the second baffle means and the bottom of the housing direct precipitated contaminants towards the inlet ports.

7. The separator as claimed in claim 6 wherein the inlet ports each define a flow area which provides inlet flow velocities of the mixtures into the inlet ports of not more than two meters per second and the outlet port defines a flow area which provides outlet flow velocities of the gases out of the outlet port of not more than one and a half meters per second.

8. The separator as claimed in claim 7 wherein the housing, the bottom thereof, and the first baffle means cooperate to define at least one flow area which is approximately 25% smaller than the flow area of one of the inlet ports.

9. The separator as claimed in claim 8 wherein the housing and the second and third baffle means cooperate to define at least one flow area which is approximately 25% greater than the flow area of one of the inlet ports.

* * * * *